Feb. 25, 1936.    S. H. CAMPBELL ET AL    2,031,691
BRAKE BEAM SAFETY SUPPORT
Filed March 16, 1935
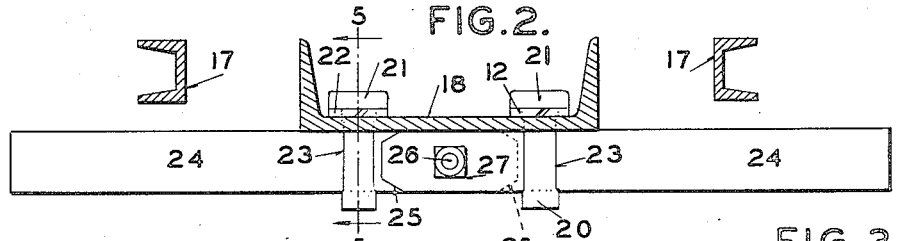
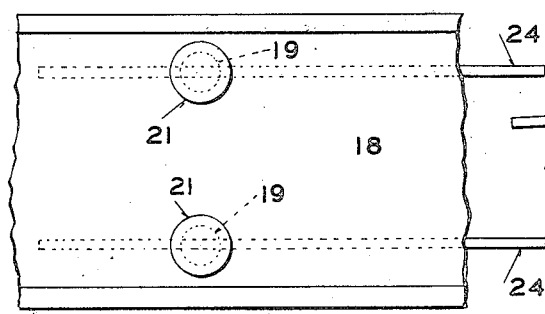
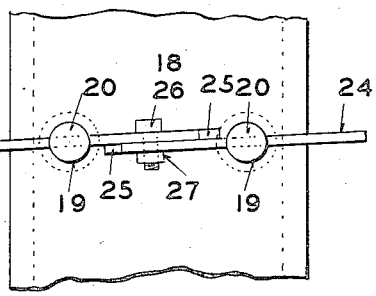
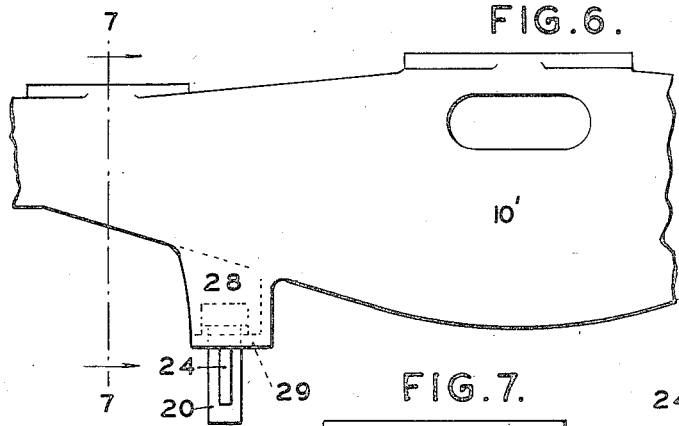
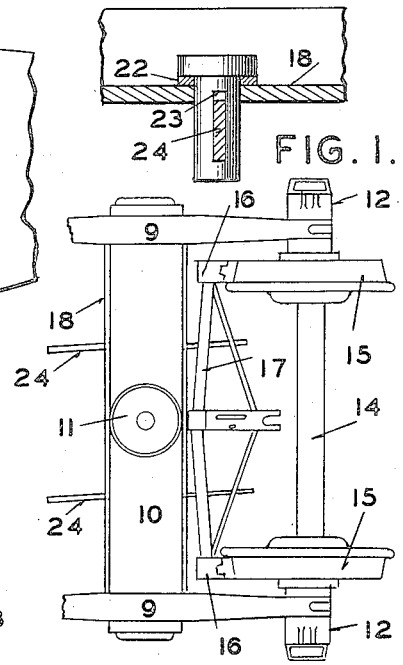
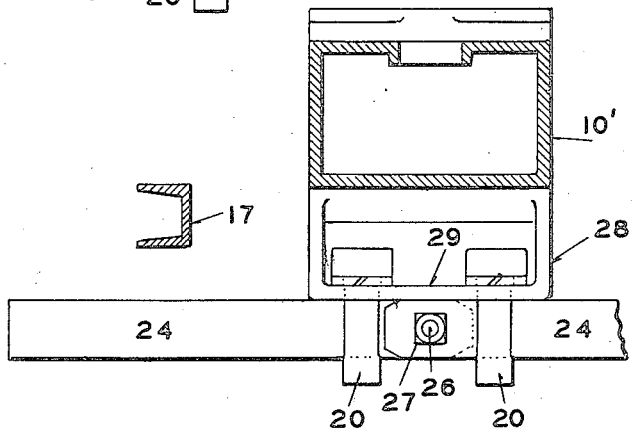
INVENTORS
S. H. CAMPBELL
E. H. PIETZSCH
BY E. E. Huffman
ATTY.

Patented Feb. 25, 1936

2,031,691

UNITED STATES PATENT OFFICE 2,031,691

BRAKE BEAM SAFETY SUPPORT

Sterling H. Campbell and Frank H. Pietzsch, St. Louis, Mo., assignors to Railway Devices Company, St. Louis, Mo., a corporation of Missouri Application March 16, 1935, Serial No. 11,411

3 Claims. (Cl. 188—210)

Our invention relates to emergency or safety supporting means for brake mechanism, i. e., means for preventing the brake beams and such parts of the brake mechanism as are supported by or fastened to the brake beams from falling on the track in the event of failure of any of the parts which normally secure the brake mechanism to the car truck. Heretofore various forms of safety devices have been provided to prevent this, but in the event of failure of a brake beam or other connected part necessitating the removal of the beam for repair, it has also been necessary to first remove the emergency safety support and to afterward reapply it. It frequently happens that the mechanics making such repairs are pressed for time and if the safety support is welded or riveted to the truck, or the fastening bolts are rusted or so placed as to be difficult of access, the repair is made without replacing the safety support in order to avoid the time consuming operations of welding, riveting or bolting involved.

One object of our invention is to provide emergency or safety supports which need not be removed when making repairs as they may readily swing under the spring plank or bolster to permit the removal of the brake beams and attached parts and, after the repair is made, may be returned to normal position and secured therein by easily accessible means.

Another object of our invention is to provide emergency or safety supports which are simple in construction and involve the use of a minimum amount of material, thus reducing the cost of manufacture.

In the accompanying drawing, which illustrates a safety support made in accordance with our invention, Figure 1 is a top plan view of a portion of a car truck to which our device is applied; Figure 2 is an enlarged vertical section taken through a portion of the truck; Figure 3 is a bottom plan view of the parts shown in Figure 2; Figure 4 is a top plan view, the support being swung out of operative position; Figure 5 is a section taken on the line 5—5 of Figure 2; Figure 6 is a side view of a truck bolster, showing a modification; and Figure 7 is a section taken on the line 7—7 of Figure 6.

Referring first to Figure 1, the numeral 9 indicates the side frames of a car truck, which frames are connected by a bolster 10 including a center bearing 11, the side frames being provided with journal boxes 12 for the axle 14 upon which are mounted wheels 15 to which the brake shoes 16 are applied. The brake shoes are carried by a brake beam 17 supported from the truck in any well-known manner (not shown). The bolster 11 is of the type provided with a spring plank 18. Formed in the spring plank at each side of the center bearing are a pair of openings 19 in each of which is rotatably mounted a pin 20 having a head 21. Positioned under the head 21 is a spring washer 22. Formed in the body of the pin is a slot 23 for the reception of one member 24 of a two-part safety supporting bar. The slot 23 is of slightly greater length than the depth of the bar 24 (as shown in Figure 3) so that the spring action of the washer 22 will draw the upper edge of the bar firmly against the lower face of the spring plank and so prevent vibration. To facilitate the insertion of the bar in the slot, its end is tapered at 25. When the parts of the bar are in normal position to support the brake beams, their ends overlap, as best shown in Figures 2 and 3, and are secured together by bolt 26 and nut 27. If it is desired to demount the brake beams the bolt 26 is removed and the bars are swung into alignment with the spring plank, as shown in Figure 4. In Figures 6 and 7 we have shown a modification applicable to car trucks which are not provided with a spring plank. In this construction the bolster 10' is provided with a bracket 28 having a horizontal shelf 29 through which pins 20 of the safety supporting means are inserted. This construction is in all respects similar to that described in connection with the type of truck employing a spring plank.

Having fully described our invention, what we claim as new and desire to secure by Letters Patent of the United States is:

1. In a device of the class described, a car truck including side frames, a connecting bolster, and brake beams; said truck being provided with a horizontal member, a pair of rotatable retainers passing vertically through said member, a two-part safety support, each part of said support passing horizontally through one of said retainers, and means for securing the parts of said support together to operatively position them under the brake beam.

2. In a device of the class described, a car truck including side frames, a connecting bolster and brake beams; said truck being provided with a horizontal member, a pair of pins passing vertically through said member and each provided with a lateral opening, a two-part safety support, each part of said support passing through one of said pins, the ends of the parts overlapping when the support is in operative position under the brake beams, and fastening means passing through said overlapping ends.

3. In a car truck comprising side frames, a bolster, and brake beams; said truck having a horizontal member, rotatable retaining means passing vertically through said member, a safety support passing horizontally through the retaining means and extending under the brake beams, said support locking said retaining means against substantial vertical movement, and means for locking said support against substantial horizontal movement.

STERLING H. CAMPBELL.
FRANK H. PIETZSCH.